United States Patent [19]

Beasley et al.

[11] E Patent Number: Re. 31,868

[45] Reissued Date of Patent: Apr. 16, 1985

[54] LOW ATTENUATION OPTICAL FIBER OF DEUTERATED POLYMER

[75] Inventors: John K. Beasley, Greenville; Richard Beckerbauer, Wilmington, both of Del.; Henry M. Schleinitz, Kennett Square, Pa.; Frank C. Wilson, Wilmington, Del.

[73] Assignee: Mitsubishi Rayon Co., Ltd., Tokyo, Japan

[21] Appl. No.: 479,472

[22] Filed: Mar. 28, 1983

Related U.S. Patent Documents

Reissue of:

[64] Patent No.: 4,138,194
Issued: Feb. 6, 1979
Appl. No.: 842,301
Filed: Oct. 14, 1977

[51] Int. Cl.[3] ..... G02B 5/172

[52] U.S. Cl. ..... 350/96.30; 350/96.34; 428/373; 428/394

[58] Field of Search ..... 350/96.29, 96.30, 96.31, 350/96.32, 96.34, 96.12; 428/373, 394

[56] References Cited

U.S. PATENT DOCUMENTS

| | | | |
|---|---|---|---|
| 3,641,332 | 2/1972 | Reick et al. | 350/96.32 |
| 3,722,981 | 3/1973 | Pinnow et al. | 350/96.30 |
| 3,779,627 | 12/1973 | Pinnow et al. | 350/96.30 |
| 3,791,714 | 2/1974 | Maurer | 350/96.34 |
| 3,993,834 | 11/1976 | Chimura et al. | 350/96.34 |

FOREIGN PATENT DOCUMENTS

| | | | |
|---|---|---|---|
| 1037498 | 7/1966 | United Kingdom | 350/96.34 |

OTHER PUBLICATIONS

Gunder et al., *Instruments and Experimental Techniques*, Sep.-Oct. 1971, vol. 14, No. 5, Part 1, "Plastic Scintillators Containing Deuterium", pp. 1348-1350.

Materials for Chemical Industry, vol. 29, No. 4, 1961, pp. 163-177.

*Kunststoff-Handbuch*, vol. IX, Carl Hanser Verlag München, 1975, pp. 183-193.

Nagai et al., "Infrared Spectra of Deuterated Polymethyl Methacrylates", *J. Polymer Sci.*, vol. 62, 595-598, 1962.

Nagai, "Infrared Spectra of Stereoregular Polymethyl Methacrylate", *J. of App. Polymer Sci.*, vol. 7, pp. 1697-1714, 1963.

Mihailov et al., "Infrared Spectra of Deuterated Poly(-methyl methacrylate)", *Die Makromolekulare Chemie*, vol. 176, pp. 789-794, (1975).

Ayrey et al., "Inverse Isotope Effect on the Rate of Polymerization of Deuterated Methylmethacrylate" *Polymer*, No. 16, p. 623, 1975.

*Primary Examiner*—John D. Lee
*Assistant Examiner*—Frank González
*Attorney, Agent, or Firm*—Brumbaugh, Graves, Donohue & Raymond

[57] ABSTRACT

Light-transmitting optical fiber having a core of a [deuterated acrylate] polymer *selected from the group consisting of a deuterated methacrylate homopolymer, a deuterated methacrylate copolymer and a deuterated methacrylate/acrylate copolymer which* exhibits remarkably high transmission of light in the visible and at certain wavelengths in the near-infrared region of the spectrum.

13 Claims, 2 Drawing Figures

LOW ATTENUATION OPTICAL FIBER OF DEUTERATED POLYMER

Matter enclosed in heavy brackets [ ] appears in the original patent but forms no part of this reissue specification; matter printed in italics indicates the additions made by reissue.

BACKGROUND OF THE INVENTION

The present invention relates to low loss optical fiber which has a core of deuterated polymer, and cladding of polymer which has an index of refraction lower than that of the core.

Optical fibers are well known in the art for transmission of light along a length of filament by multiple internal reflections of light. Great care is taken to minimize light losses due to absorption and scattering along the length of the filament, so that light applied to one end of the optical filamentary material is efficiently transmitted to the opposite end of the material. The light transmitting portion or core of the optical filamentary material is surrounded by cladding having an index of refraction lower than that of the core, so as to achieve total internal reflection along the length of the filament. This cladding is normally chosen to be transparent since an opaque cladding tends to absorb or scatter light.

An important consideration in formation of optical fibers is minimization of any factor which increases the attenuation of transmitted light within such a fiber.

Optical fibers which consist wholly of inorganic glasses, or which have an inorganic glass core surrounded by a thermoplastic or thermosetting polymer, or which consist wholly of thermoplastic polymer, are all known in the art. Those having inorganic glass cores, especially fused silica cores, exhibit high light transmission, i.e., low attenuation of transmitted light, but are relatively easily damaged by fracture if bent to too small a radius of curvature or otherwise abused; they can be protected by use of a shielding layer, but this adds undesired bulk, weight and expense, and nevertheless does not always enable the fiber to be used in situations where bending to a small radius of curvature is helpful or required. The all-plastic fibers are less subject to fracturing, but have the deficiency that they more strongly attenuate light passing therethrough. The present invention is directed to improving the capability of all-plastic optical fibers to transmit light.

SUMMARY OF THE INVENTION

According to the present invention, there is provided an optical fiber comprising a core and cladding which consist essentially of organic high polymers, said core being a [deuterated acrylate] polymer *selected from the group consisting of a deuterated methacrylate homopolymer, a deuterated methacrylate copolymer and a deuterated methacrylate/acrylate copolymer* and containing less than 20 mg of hydrogen per gram of polymer as measured by nuclear magnetic resonance at 60 MHz.

DESCRIPTION OF THE PREFERRED EMBODIMENTS

Figure 1:
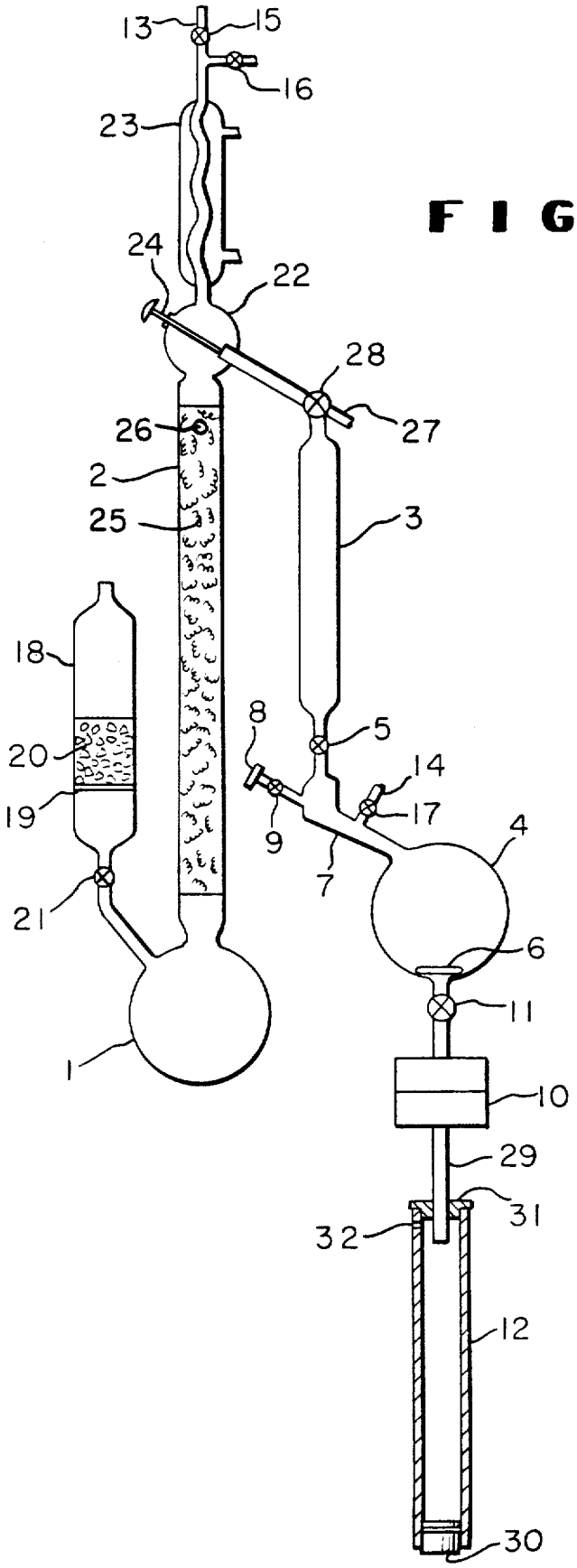
FIG. 1 is a schematic drawing, not to scale, of apparatus suitable for purifying deuterated methyl methacrylate and charging a polymerization vessel.

In the optical fibers of present invention, the core of the fiber is a copolymer containing at least 60 mol %, preferably at least 80 mol %, most preferably at least 90 mol % of deuterated methyl methacrylate, or deuterated polymethyl methacrylate polymer itself. As the copolymer component, comonomers such as acrylic esters, e.g., methyl acrylate, ethyl acrylate, propyl acrylate and butyl acrylate; methacrylic esters, e.g., cyclohexyl methacrylate, benzyl methacrylate, ethyl methacrylate, propyl methacrylate and butyl methacrylate may be used. However, it is preferred that at least 90 mol % of the core polymer be composed of methyl methacrylate, so as to have high light transmission. The most highly preferred copolymers are those prepared from at least 95 mol % deuterated methyl methacrylate and 0 to 5 mol % of methyl acrylate, ethyl acrylate or ethyl methacrylate. The copolymers are preferred because they have greater flexibility, and are less subject to thermal depolymerization, compared to homopolymer of methyl methacrylate. For lowest attenuations of light, it is also highly preferred that all comonomers used also be deuterated.

As used herein, the term "deuterated" is intended to refer to both partially and completely deuterated materials. Although partially deuterated monomers and comonomers can be used, the best results are attained when perdeuterated, i.e., completely deuterated monomers and comonomers are used. A particularly useful deuterated monomer is methyl methacrylate-$d_8$.

The resulting fibers, like their non-deuterated counterparts, are optically transparent, the wavelengths at which minimum attenuation of transmitted light occurs being shifted from those at which the non-deuterated counterparts have minimum attenuations. Lowest attenuation of light at the wavelengths of maximum transmission is attained as the amount of C—H bonds (as distinct from C—D bonds) in the core polymer is minimized. The best results are attained by using deuterated monomer of such isotopic purity, and amounts of initiator and chain transfer agent, such that the core of the optical fiber contains less than 20 mg, preferably less than 10 mg, and most preferably less than 1 mg of hydrogen (as distinct from deuterium) per gram of polymer, as measured by nuclear magnetic resonance at 60 MHz. Thus, while a fiber having a core which contains 20 mg hydrogen per gram of polymer exhibits significantly better transmission of light when compared to a conventional fiber having a core of polymethyl methacrylate, the fibers being made in the same way, best results are attained by minimizing the amount of hydrogen in the core.

The cladding polymer applied to the core is optically transparent and has an index of refraction at least 0.1% lower than that of the core, preferably at least 1% lower, and most preferably at least 5% lower.

Examples of suitable cladding materials include those disclosed in British patent specification No. 1,037,498 such as polymers and interpolymers of vinyl fluoride, vinylidene fluoride, tetrafluoroethylene, hexafluoropropylene, trifluoromethyltrifluorovinyl ether, perfluoropropyltrifluorovinyl ether and fluorinated esters of acrylic or methacrylic acids having the structure $$X(CF_2)_n(CH_2)_mOC(=O)-C(Y)=CH_2$$

wherein X is selected from the group consisting of F, H, or Cl, and n is an integer of from 2 to 10, m is an integer from 1 to 6 and Y is either $CH_3$ or H, and copolymers thereof with esters of acrylic and methacrylic acids with lower alcohols such as methanol and ethanol. Copolymers of $$X(CF_2)_n(CH_2)_mOC(=O)-C(Y)=CH_2,$$

where X, Y, m and n are as defined above with the methyl and ethyl esters of acrylic and methacrylic acids and which are substantially amorphous constitute a preferred class of polymers.

Fluorinated polymers which contain pendant side chains containing sulfonyl groups such as disclosed in U.S. Pat. No. 3,849,243, and fluorine-containing elastomers such as those disclosed in U.S. Pat. Nos. 2,968,649 and 3,051,677 can also be used. Others include copolymers of tetrafluoroethylene with other monomers such as hexafluoropropylene and perfluoroalkyl perfluorovinyl ether as disclosed in U.S. Pat. Nos. 2,946,763 and 3,132,123. Modified and unmodified copolymers of tetrafluoroethylene and ethylene as disclosed in U.S. Pat. No. 2,468,664 can also be used.

Cladding polymers which are not crystalline, i.e., which are substantially amorphous, are preferred, because optical fibers clad with a crystalline polymer tend to have higher attenuations of transmitted light than those coated with an amorphous polymer. Optical fibers clad with a crystalline polymer, however, do have utility, particularly when only a short length of optical fiber or cable is needed. When the optical fiber or cable will be used in short lengths where it is subjected to high temperatures, the core and cladding should be polymers which will not soften at the high temperatures, and many polymers suitable in such cases tend to be crystalline. When a crystalline polymer is employed as cladding, however, best results (i.e., lowest attenuation of transmitted light) are attained when the optical fiber is made under such conditions that the polymer cladding has the highest transparency attainable by quickly quenching it after polymer extrusion.

The diameter of the core of the optical fiber can vary from relatively thin to relatively thick constructions. A suitable diameter range is 50 to 500 μm. If the light source is large, e.g., from an LED (light emitting diode), a thick core has the advantage in its ability to capture a greater proportion of incident light, but has the disadvantage of having a larger minimum bending radius. If the light source is small, e.g., a laser, a relatively thin core is suitable for capturing incident light and has the advantage of a smaller minimum bending radius.

Since the cladding material reflects light traveling through the core, the thickness of the cladding generally is not critical, so long as its thickness is at least a few wavelengths of the light to be transmitted. An example of a suitable range of thickness of the cladding is about 5 to 50 μm, preferably 10 to 20 μm.

Optical fibers of the present invention have remarkably low attenuations of transmitted light. Optical fibers having attenuations of less than 300 dB/km (decibles per kilometer) in the vicinity of 690 nm and of 785 nm are routinely made by the present invention, and attenuations below 200 dB/km, on the order of 150 dB/km, have been attained.

The deuterated [acrylate] polymer used as a core of the optical fibers of the present invention exhibits unexpectedly low attenuations of light at certain wavelengths mentioned above, which are so-called transmission bands or windows, or simply, windows. The transmission window at about 785 nm is in the infrared, and that at about 690–700 nm is in the visible region. For reasons not presently understood, in the case of two seemingly identical optical fibers of the present invention having a [deuterated acrylate] core, *made from a polymer selected from the group consisting of a deuterated methacrylate homopolymer, a deuterated methacrylate copolymer and a deuterated methacrylate/acrylate copolymer* one may exhibit its minimum attenuation of light at a frequency in the window at 690–700 nm, while the other may exhibit its minimum attenuation at a frequency in the window at about 785 nm. Accordingly, transmission of light at both windows must be determined in order to find the frequency at which maximum transmission of light occurs for each optical fiber prepared.

Methyl methacrylate-$d_8$ can be made as described in the art by Nagai et al., J. Poly. Sci., 62, S95-98, (1962), wherein briefly, acetone-$d_6$ is reacted with HCN to form acetone-$d_6$ cyanohydrin, the latter is treated with $H_2SO_4$ to remove the elements of DOH and form the $H_2SO_4$ salt of methacrylamide-$d_5$, which is reacted with $CD_3OH$ to form methyl methacrylate-$d_8$. Although DCN, $D_2SO_4$ and $CD_3OD$ can be used in place of HCN, $H_2SO_4$ and $CD_3OH$, respectively, no improvement in isotopic purity of the methyl methacrylate-$d_8$ was observed by doing so. Other deuterated acrylate *and methacrylate* esters can be prepared by a similar reaction scheme.

A preferred method for making the optical fiber of the present invention, which comprises a core of deuterated polymer which contains a major proportion of methyl methacrylate units surrounded by a cladding, comprises the steps (1) (a) mixing in a sealed system deuterated vinyl monomers of which at least 60 mol % is methyl methacrylate, said monomers containing 0 to 10 ppm biacetyl and 0–500 ppb of transition metal ions and being substantially free of particulate matter, with a free radical polymerization initiator and a chain transfer agent;

(b) transferring said mixture in a sealed system to a polymerization vessel, and closing said vessel;

(2) maintaining said mixture without a free liquid surface in said vessel under a pressure of 7–25 kg/cm$^2$, while simultaneously: maintaining the temperature of said mixture below about 70° C. until conversion to polymer is at least 60% complete dilatometrically, raising the temperature at a rate to reach a temperature of 90° to 100° C. at the time that conversion to polymer is at least 95% complete dilatometrically, and continuing to raise the temperature at about the same rate to a temperature in the range of 115° to 140° C., holding the temperature in said range for at least a half hour and cooling to form a solid preform of said deuterated polymer;

(3) (a) transferring said solid preform of said deuterated polymer to the barrel of a ram extruder adapted to receive it; (b) advancing said solid preform through said barrel with a ram into a heated zone, whereby said preform is softened only at its forward end, and extruding said core of said fiber, and (c) applying to said core a polymer cladding which is substantially amorphous and which has an index of refraction below that of said deuterated polymer.

Pursuant to making an optical fiber of the present invention, it is preferred to use monomer of high quality. To this end, it is important to remove from the monomers, especially those from which the core of the fiber will be made, those substances which if retained would absorb or scatter light introduced into the optical fiber made therefrom.

It is preferred to remove from the monomers impurities which absorb light of wavelengths which the optical fiber is intended to carry. It has been found that methyl methacrylate ordinarily contains biacetyl, and that the amount of biacetyl should be reduced to no more than about 10 ppm (parts per million), preferably no more than 5 ppm. Removal of the impurities can be accomplished by treatment with alumina, followed by distillation.

Although any type of alumina can be used, for most effective removal of impurities it is best to use basic alumina and that it be of activity grade 1. Such treatment removes or reduces that amount of compounds having labile hydrogen or deuterium and of highly polar compounds such as biacetyl. The treatment can be accomplished prior to distillation of the monomer by placing the alumina on a filter which will retain it, and filtering the monomer through the alumina directly into the still pot. This operation is suitably carried out under a nitrogen atmosphere.

In the step of distilling the deuterated methyl methacrylate or other monomer, only a center cut of distillate is retained for polymerization, while substantial foreshot and heel fractions are set aside.

Another method of purification which can be used is preparative scale gas—liquid chromatography. Distillation is a preferred method and will be the method referred to in the detailed description below.

Transition metal ions, especially those of transition elements of the first series (i.e., elements of atomic number 22 through 28), and copper, lead, aluminum, silicon, vanadium, chromium, manganese, iron and nickel are also deleterious impurities, because they absorb light of wavelengths which the optical fiber is intended to carry. The amount of such impurities can also be conveniently lowered to acceptable levels by distillation. It is preferred that the amount of such impurities be no greater than about 500 ppb (parts per billion), more preferably no greater than 100 ppb, total for all such ions present.

It is also preferred that particulate matter be removed because these particles absorb and/or scatter light. To the extent possible, the monomers (and the other components of the polymerization charge) should be substantially free of such particulate matter. Although particles smaller than about 200 nm (0.2 $\mu$m) cannot be resolved with an optical microscope, with the use of a transverse intense beam of light in an optical microscope points of light are observed in an optical fiber not only at the particles which are larger than about 200 nm, but also at smaller particles of undetermined size. Even though it is not possible to precisely determine the sizes of these particles it is nevertheless important to remove those, regardless of size, which are detectable by light scattered from the particle. Particles of all sizes can be effectively removed by distillation of the monomers, providing that the distillation is carried out such that there is no entrainment. The best (i.e., cleanest) commercially available polymers have on the order of 300 to 1000 particles/mm$^3$, and can provide optical fibers with attenuations of light down to ca. 500 dB/km and having at best a few short lengths as low as 400 dB/km. By the present invention, optical fibers having no more than 100 particles/mm$^3$ are easily made. Particle counts below 10 particles/mm$^3$ are also easily attained by the present invention, and counts below 2 particles/mm$^3$ have been attained. Accordingly, in reference to the monomers, by "substantially free" is meant that the mixed vinyl monomers preferably contain no more than about 100 particles/mm$^3$.

Any comonomer used should be similarly purified, but such purification ordinarily need not be as rigorous, especially when the amount used is less than 10 mol % of the total monomer because less impurity is introduced with the smaller quantity of monomer and is diluted upon mixing the monomers.

When distillation is employed as the method of purification, the distillation is conducted under a slight positive pressure of an inert gas such as argon, nitrogen or helium. As is known in the art, so as to prevent polymerization of monomer in the fractionating column, a concentrated solution of polymerization inhibitor in the same monomer can be introduced at the top of the column throughout the fractionation. Alternatively, a solid piece of inhibitor can be placed at or near the top of the fractionating column where it will slowly dissolve in the liquid in the column.

Polymerization is carried out with the use of a soluble free radical polymerization initiator, ordinarily an azo type initiator. For the sake of convenience, the initiator type and concentration are chosen to provide about 50% conversion to polymer in about 16 hrs. To achieve this, it is preferred to use an initiator having a half-life at 60° C. between about 300 and 3,000 minutes, preferably about 1,000 minutes. 2,2'-azo-bis(isobutyronitrile) is the preferred initiator because it is available in high purity and because it can be handled safely. Other initiators with somewhat longer or shorter half-lives, such as 1,1'-azo-bis-(cyclohexanecarbonitrile) or 2,2'-azo-bis(2,4-dimethylvaleronitrile), can also be used; for those having longer half-lives, the temperatures of the heating stages used during polymerization, especially the first stage, will have to be higher than when 2,2'-azo-bis(isobutyronitrile) is used, and/or greater amounts can be used, and conversely, for those having shorter half-lives, the temperatures of the heating stages used during polymerization, especially the first stage, will have to be lower, and/or smaller amounts may be used. It will be clear to one skilled in the art than many combinations of initiator, initiator concentration and polymerization temperature can be used. Combinations of initiators having different half-lives can also be used. The initiator and its concentration are so chosen that some will remain for the later heating stages of the polymerization step. A high purity initiator should be used so as to introduce the least possible amount of impurity into the resulting polymer.

A chain transfer agent is also included in the polymerization system. Both mono- and multifunctional chain transfer agents can be used. Typical examples include n-butyl mercaptan, lauryl mercaptan, mercaptoacetic acid, 2,2'-dimercaptodiethyl ether, ethylene bis(2-mercaptoacetate) commonly referred to as glycol dimercaptoacetate (GDMA), ethylene bis(3-mercaptopropionate), 1,1,1-trimethylolethane tris(3-mercaptopropionate), pentaerythritol tetrakis (3-mercaptopropionate). For reasons not entirely understood, the preferred chain transfer agents are those having mercaptan groups on carbon atoms adjacent to the carbonyl of a carboxylic functional group, i.e., of the type disclosed in U.S. Pat. No. 3,154,600, and having mercaptan difunctionality, because their use generally provides polymer of higher conversion and optical fiber having higher light transmission when compared to those prepared with other chain transfer agents. It is preferred to purify the chain transfer agent, which can be done by distillation.

The quantities of initiator and chain transfer agent are so chosen to give a polymer having an inherent viscosity of at least about 0.4 dl/g, as measured at 25° C. on a 0.5% (wt./vol.) solution in chloroform (i.e., 0.5 g of polymer in 100 ml. of solution). At inherent viscosities of 0.38 dl/g or lower the polymer is more brittle, while at 0.4 dl/g and higher the polymer is reliably tough. Although polymers having inherent viscosities as high as 0.5 and 0.6 can be used, they are difficult to extrude because they are so viscous at temperatures which are suitable for extrusion without polymer degradation that special heavy duty equipment is required. Polymers having an inherent viscosity in the range 0.40 to 0.44 are tough and do not require heavy duty equipment, and thus are preferred. Further, it is difficult to extrude the very high viscosity polymer into fibers having a smooth, fracture-free surface, as most often the extrudate will have a fractured surface which directly causes a much higher attenuation of transmitted light. To achieve an inherent viscosity in the preferred range, appropriate amounts of the polymerization initiator and chain transfer agent are easily determined empirically. The polymerization initiator is ordinarily used in an amount of about 0.001 to 0.05 mol %, based on the total monomer and for the preferred initiator preferably 0.01 to 0.02 mol %, and the chain transfer agent is ordinarily used in an amount of about 0.1 to 0.5 mol %, based on the total monomer, and for the preferred difunctional chain transfer agents preferably in the range of 0.1 to 0.25 mol %.

It is preferred to minimize the amount of foreign particles in the core polymer, because they absorb or scatter light and thus increase the attenuation of transmitted light in the fiber. The preferred process for making the optical fibers of the present invention is therefore designed to meet this goal. Transfers of the various substances are carried out to the extent possible in a sealed or closed system so that recontamination of purified materials by dust, dirt or particulate matter of any kind does not occur. Particles introduced by adventitious contamination are advantageously removed as the polymerization charge is transferred to the polymerization vessel. Removal of particles larger than a size within the range of 0.2 to 1 μm is conveniently done at this stage. Particles can be removed by filtration or centrifugation. Filtration is preferred because of its convenience.

It has been found useful to use for the first phase of the process, which is preparation of the polymerization mixture, a series of connected receivers and vessels as depicted schematically in FIG. 1, beginning with a still for the major component of the polymerization mixture, deuterated methyl methacrylate, going through holding and mixing vessels, and ending with the polymerization vessel. A convenient sequential arrangement begins with a still pot 1 equipped with a column 2 packed, for example, with glass helices, and having a volumetrically calibrated receiving vessel 3 which is connected to a mixing vessel 4 by a line which is equipped with a greaseless stopcock or other type of greaseless valve 5. The mixing vessel 4 is equipped with a magnetically driven stirrer 6 and an entrance port 7 which is sealed by a serum stopper 8 and a stopcock 9, and is connected to a microporous filter 10 by a line which is equipped with a greaseless stopcock 11 or other type of greaseless valve. Although, in the arrangement shown, distilled monomer is introduced into the mixing vessel 4 through the entrance port 7, other arrangements are also possible wherein the monomer is transferred from receiver 3 to vessel 4 through a line separate from the entrance port 7. The filter 10 is of known type which is inert to all constituents of the polymerization mixture, such as polytetrafluoroethylene, supported on a porous metal plate. The pore size of the filter can range from 1 micrometer down to about one-twentieth of the wavelength of light to be carried by the optical fiber, and is preferably in the range of 0.2 to 1 micrometer. The filter 10 is in turn connected by a line 29 to the polymerization vessel 12. An inert atmosphere, such as argon, helium or nitrogen, is maintained throughout the whole arrangement of apparatus by introduction through gas inlets 13 and 14, and its flow is controlled and directed by the various stopcocks 15, 16, 17 and others shown. The various elements of the apparatus can be broken down into smaller units by ground glass joints, ring seals, or other known means not shown.

Procedurally, deuterated methyl methacrylate is introduced into still pot 1 through a filtering vessel 18 which contains a filter element 19 which supports a bed of alumina 20. Following charging of the pot, stopcock 21 is closed. The packed column 2, still head 22, condenser 23 and needle valve 24 function in known manner to control take-off of distillate. A small lump or two of polymerization inhibitor 26 is placed on or just under the top surface of the packing 25 in the column 2. During the course of the distillation it slowly dissolves and flows down the column in the downward flow of liquid.

A foreshot is removed through outlet 27 controlled by stopcock 28 and is set aside. The desired center distillate fraction is collected in the receiving vessel 3. A first portion of distilled deuterated methyl methacrylate is transferred through the connecting line from the distillation receiver to the mixing vessel 4. Separately, there is prepared a solution of the desired polymerization initiator and chain transfer agent in the desired amounts in the comonomer, or, if no comonomer is used, in a small, measured amount of separately purified deuterated methyl methacrylate; this solution is introduced into the mixing vessel through the entry port 7 with the aid of a hypodermic syringe inserted through the serum stopper 8 and stopcock 9. A second portion of distilled deuterated methyl methacrylate is transferred through the connecting line from the distillation receiver 3 to the mixing vessel 4. The purpose of reserving part of the deuterated methyl methacrylate for the final addition to the mixing vessel is for washing all traces of the minor components of the polymerization mixture, i.e., the comonomer, polymerization initiator and chain transfer agent, from the entry port 7 into the mixing vessel 4; loss of part of the minor components by adhering within the entry port would lead to a greater degree of nonuniformity of the resulting polymer among successively run polymerizations, as compared to the loss of a trace of the major constituent, deuterated methyl methacrylate, within the entry port. The combined materials are thoroughly mixed with the magnetic stirrer 6 to assure homogeneity. The mixture is then passed through the filter 10, and into the polymerization vessel 12.

It has now been found desirable to minimize exposure of the core polymer to any circumstance or condition which will lead to degradation of the polymer as by heat or shear stress, formation of bubbles, or introduction of any solid particulate matter. Accordingly, polymerization and extrusion procedures have been designed to minimize both exposure of the polymer to adverse conditions, and contact of the polymer with any other material or surface, during the remaining manipulative steps. To this end, ram extrusion of a solid block of polymer is employed for extrusion of the core of the fiber, inasmuch as use of a screw extruder, which entails extensive contact of the polymer with metal surfaces, can lead to contamination by foreign particles, extensive heating, shear stress, with possible degradation of polymer, and introduction of bubbles. Therefore, according to the present invention, the polymer is prepared in the shape of a preform suitable for the barrel of the ram extruder to be used in making the core of the optical fiber.

The polymerization vessel 12 is thus of a shape to make the required polymer preform. Because of the manner in which a ram extruder operates, the preform will ordinarily be in the shape of a rod. Although rods of various cross-sectional shapes could be used, a circular cross-section is most suitable, because the most convenient cross-sectional shape for fabrication of the polymerization vessel and extruder barrel is circular. Additionally, polymer rods which are cylindrical are preferred because such rods lead to maximum uniformity during extrusion, and this an optical fiber core having more uniform properties. The polymerization vessel 12 is fabricated of metal of sufficient thickness to withstand the pressure level to be employed during polymerization, typically a pressure in the range of 7 to 25 kg/cm$^2$. Suitable materials of construction include the stainless steels. So as to preclude contamination of the polymer by transition metal ions at even the parts-per-billion level, it is preferred to plate the cavity of the polymerization vessel with an inert metal such as gold or chromium. The polymerization vessel 12 is sealed at its lower end with a piston 30 having a gasket.

Following transfer of the polymerization mixture from the mixing vessel 4 through the filter 10 and line 29 to the polymerization vessel 12, the polymerization vessel is removed from the sealed or closed system described above by removal of plug 31 and immediately sealed with a piston (not shown) which is like piston 30 and which fits its cylindrical cavity. Sealing with the piston is done without delay so as to avoid contamination by dust or any foreign substance by exposure to the atmosphere. The gasket of each piston is fabricated of a material which is inert to all components of the polymerization mixture at the temperatures employed, such as polytetrafluoroethylene, to prevent contamination of the polymerization mixture and resulting polymer.

The polymerization should be carried out without any free gas space being present in the polymerization vessel. The presence of gas in such space results in gas being present in the polymer preform, both dissolved therein and in the form of bubbles, which leads to an extruded core which contains bubbles or voids and thereby attenuates transmitted light more than a core without bubbles or voids. So that the polymerization mixture will have no free liquid surface during polymerization, various methods can be used to exclude all free gas space from the vessel. One suitable method is to fabricate the polymerization vessel 12 with a bleed hole 32 of small diameter (typically less than 1 mm) located a short distance from the open end of the vessel. The vessel is filled with polymerization mixture to above the bleed hole, and the piston seal is put into place and pushed into the cavity until all free gas and excess liquid mixture is forced from the bleed hole and the piston seals off the liquid in the major part of the cavity so that it is isolated from the bleed hole. There is no danger of loss of material through the bleed hole during polymerization, inasmuch as the mixture assumes a smaller volume during polymerization, as will be discussed in greater detail below.

The polymerization is carried out under pressure, suitably 7 to 25 kg/cm$^2$ (100 to 350 psig), to preclude vaporization of monomer and consequent formation of bubbles or voids in the polymer preform, for reasons similar to those set forth in the previous paragraph. Pressure is maintained by applying force against the piston seals throughout the reaction with a press.

Maintaining the polymerization mixture under pressure also provides a means of assessing the progress of polymerization, which information is used during the course of polymerization in setting the heating program employed. By maintaining the polymerization mixture under pressure, it is possible to follow the progress of the polymerization dilatometrically, i.e., by following the change in volume of the mixture. As noted above, the mixture assumes a smaller volume upon polymerizing, the polymer occupying a volume of the order of about 80% of that of the monomers. Progress of the polymerization can be followed, for example, by placing an index mark on the rod used to transmit force to one of the piston seals at such a position that it will remain visible outside the cavity of the polymerization vessel throughout the polymerization, and following its change in position with a cathetometer. From the initial volume of the reactants employed, the final volume of polymer to be prepared as determined if necessary from preliminary runs, and the initial position of the index mark, it is a simple matter to estimate where the index mark will be when polymerization has progressed to any given percentage of completion. It should be borne in mind, however, in view of the different thermal coefficients of expansion of the polymerization vessel and mixture therein, and the progressive heating to higher temperatures during the course of the reaction, that the cathetometer measurements may not provide a direct indication of conversion to polymer unless corrections are applied, and may differ from data made under constant conditions by as much as a few percent. It is found in practice that final cathetometer readings almost invariably indicate an apparent contraction in volume of greater than 100%, and sometimes as much as 103%, of that to be expected. Subsequent determination of residual unreacted monomer in the polymer made in such runs shows the presence of a small, variable amount of unreacted monomer. For present purposes polymerization should be at least 98%, preferably 99%, complete. Typically, conversions to polymer of 99.1 to 99.3% can be routinely attained in the present invention.

The polymerization mixture is carefully and progressively heated to higher temperatures in such manner as to attain at least 98% conversion to polymer, but to prevent development of an uncontrolled or "runaway" reaction, which would lead to a thermally degraded product. The mixture is first maintained below about 70° C., preferably between 55° C. and 70° C., until conversion to polymer is at least 60% complete, preferably 65 to 75% complete. The mixture is next heated to raise the temperature at a rate to reach 90° to 100° C. at the time that conversion to polymer is at least 95% complete. Heating to raise the temperature at about the same rate is continued until a temperature in the range of 115° to 140° C., preferably 125°-135° C., is attained, and finally a temperature in the same range is maintained for at least one half hour, preferably at least one hour. The resulting polymer is then cooled. Pressure in the range of 7 to 25 kg/cm$^2$is maintained during the entire heating program. The pressure is released only after the temperature of the polymer has dropped below 100° C., which is the boiling point of methyl methacrylate, so as to preclude formation of bubbles by traces of residual monomer.

Depending on the diameter of the cavity of the polymerization vessel, and thus on the diameter of the polymer preform to be prepared, the specific rate of heating will vary to some extent, but the conditions will always conform to the schedule of the previous paragraph. For example, when the diameter is 28.7 mm (1.13 in), after attaining a conversion to polymer of at least 60% below a temperature of 70° C., the mixture is heated to raise the temperature at a rate of 35° to 45° C. per hour until a temperature of 115° to 140° C. is attained, which rate will result in at least 95% conversion to polymer when a temperature of 90° to 100° C. is attained. For smaller diameters, a rate of temperature increase which is the same or faster can be used. For large diameters, a slower rate of temperature increase is required.

Figure 2:
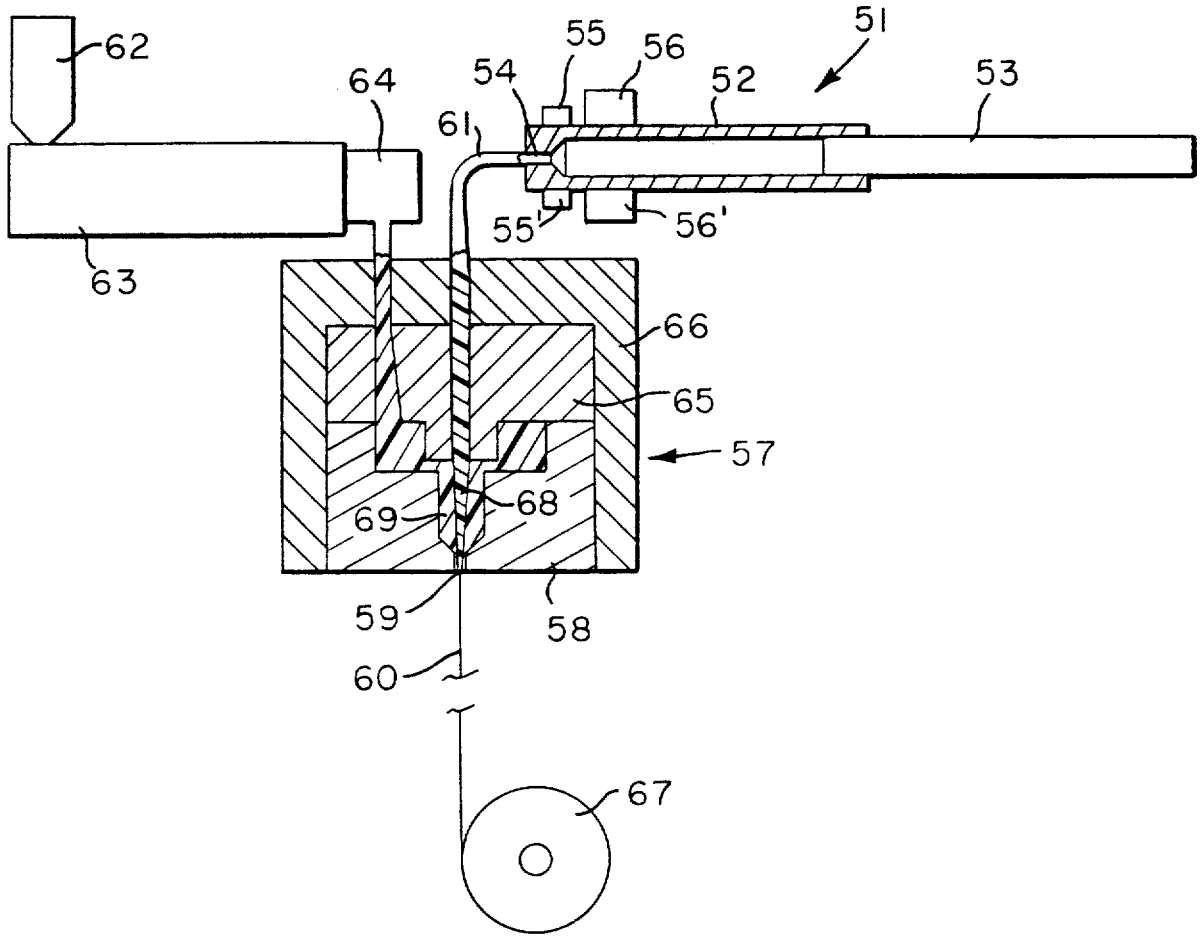
FIG. 2 is a drawing, partly schematic and partly cross-sectional, not to scale, of apparatus suitable for making optical fiber from a polymer preform.

The polymer preform is then transferred from the polymerization vessel 12 to the barrel 52 of a ram extruder 51 shown in FIG. 2. As noted above, the preform is fabricated in a shape which closely matches the barrel 52 of the ram extruder. The inside diameter of the extruder barrel is suitable slightly greater than the inside diameter of the polymerization vessel. During transfer, the preform should not be handled, or retained exposed to the atmosphere unduly, so as to minimize contamination of the preform with dust, oils from the skin, etc. It is best to transfer the preform without touching it, but if handling is necessary, lint-free gloves should be worn. If there will be any delay between fabrication of the polymer preform and extruding it, it is best to store it either by retaining it in the polymerization vessel or by holding it in the extrusion barrel. If desired, however, it can be stored in an intermediate container such as a clean plastic bag, but care should be exercized in selecting a type of plastic bag which does not contain any slip agent or sizing on its surface.

The preform is then extruded by advancing the preform through the barrel 52 with a ram 53 toward an extrusion orifice 54 through which the polymer is forced to form the core of the fiber. The ram can be either of the constant rate type, or the constant stress type, the latter being used in combination with a melt metering pump such as a gear pump. The constant rate ram is preferred because its use does not require a melt metering pump, the use of which pump introduces a potential opportunity to contaminate the polymer with foreign particles.

It is preferred to carry out the ram extrusion without melting the complete preform at the same time. The extrusion barrel 52 is heated only at its forward end by heating elements 55, 55' so that the polymer is softened just before it is forced through the extrusion orifice 54. Immediately behind the heated zone of the barrel, cooling coils 56, 56' are preferably installed to prevent conduction of heat along the barrel 52 and consequent heating of polymer farther away from the orifice. Operation in this manner results in reheating of the polymer for the minimal time needed to extrude it into fiber form, and consequently minimizes opportunity for thermal degradation of the polymer to substances which will impair the optical transparency of the fiber.

The temperatures employed for extrusion will vary somewhat with the polymer composition, but for the deuterated polymethyl methacrylate polymers described hereinabove, the temperature of the spinning head 57 will ordinarily be in the range of about 200°-240° C. and about 220°-280° C. the forward end of the barrel where the preform is softened. For the copolymers which contain up to 5% of comonomer, the preferred temperatures are 210°-220° C. at the spinning head and 240°-250° C. at the forward end of the barrel.

The cladding of the optical fiber can be applied to the core by various methods. Such methods include coextrusion and solution coating, both of which methods are well known in the art. By coextrusion is meant an operation wherein both core and cladding polymers are fed through the same orifice 59 in spinneret plate 58 from which is extruded a composite fiber 60 wherein the core polymer is completely surrounded by a substantially uniform thin layer of the cladding polymer. Coextrusion is the preferred method for making optical fibers in the present invention. Solution coating, however, is also a practical method, and, if employed, should be carried out as an in-line process step just after extrusion of the core, so as to minimize opportunity for the core to be contaminated by any material, such as particles of dust or dirt.

The spinning head 57 is of known type such as described in U.S. Pat. No. 3,992,499, specifically of the type shown in the left-hand part of FIG. 1 thereof. The spinning head 57 had a spinneret plate 58 and a meter plate 65 in a body 66. The core polymer is led from the orifice 54 of ram extruder 51 to the spinning heads 57 by line 61, and is shown as molten core polymer stream 68. The cladding polymer is introduced from reservoir 62 into conventional screw extruder 63 and metered by melt metering pump 64 into the spinning head 57, and is shown as molten cladding polymer stream 69.

Regardless of whether the fiber is made by coextrusion or by core extrusion followed by solution coating of the cladding, the diameter of the extrusion orifice 59 can vary, depending on the desired fiber diameter, and the amount of melt draw down taken. The fiber is drawn immediately after it exits from the spinning head and while it is still in a heat-softened state in order to induce molecular orientation for the purpose of imparting toughness to the fiber. The machine draw ratio is the ratio of the cross-sectional area of the die orifice to the cross-sectional area of the optical fiber if it is made by coextrusion or to the cross-sectional area of the core of the optical fiber if it is made by solution coating.

Line speed following extrusion can vary widely, depending on the capability of the equipment employed. Line speeds of 15 to 90 m/min (50 to 300 ft/min) are typical, but higher and lower speeds can also be used.

Speeds in the range of 35 to 60 m/min (120 to 200 ft/min) provide highly satisfactory results. A cross-flow of air blown by means not shown can be used to quench the freshly extruded fiber; air flow velocities of 3 to 15 cm/sec (0.1 to 0.5 ft/sec) are suitable. The drawn optical fiber is wound up on drum 67.

Other conventional methods described in the art for making all-plastic optical fibers can also be used to make the optical fibers of the present invention. For any particular method used, the optical fiber of the present invention will have a lower attenuation of light than a non-deuterated counterpart which is otherwise the same. The method described herein in detail, however, is a preferred method for attaining the lowest attenuation of light at a transmission window.

The optical fibers of the present invention, by virtue of their lower attenuation of light when compared to their non-deuterated counterparts, have the advantages that they can be used in longer run lengths and that they provide higher data transmission rates since they can be used with higher speed infrared emitting diodes and solid state lasers.

In the examples which follow, where are intended to be exemplary and not limiting as to the invention claimed, all boiling points given are uncorrected.

EXAMPLE 1

Perdueteromethyl methacrylate (MMA-$d_8$) was synthesized by the method of Nagai et al., described briefly hereinabove.

A. Purification of MMA-$d_8$

Two lots of crude MMA-$d_8$ were treated to remove water as follows:

1. 30 gms of 5A Molecular Sieves were added to 482 gms of a first lot known to contain 1.25% water. 2. 51.5 gms of 5A Molecular Sieves were added to 726 gms of a second lot known to contain 1.42% water. The two lots were allowed to stand for 3½ days at about 0° C.

Then 454.3 grams of monomer from 1 (above) and 50.0 grams of monomer from 2 (above) were passed through a 37-mm-diameter × 15-cm-high bed of Woelm Basic Aluminum Oxide, Activity Grade 1; 387.4 grams were collected in a still pot for distillation and inhibited with N,N'-diphenylpara-phenylene diamine (DPPD).

Distillation was conducted with an 11-mm-diameter vacuum jacketed and insulated column packed for 28 cm with Podbielniak "Heli-Pak" 316 stainless steel packing (1.3 mm × 2.5 mm × 2.5 mm, or 0.5 in × 0.1 (in × 0.1 in) and for 12 cm with 4.8 mm (3/16 in) glass helices. Two small DPPD chunks were placed near the top of the column to inhibit polymerization in the column as a solute carried down by the liquid phase.

Approximately 68 grams of distillate were collected as a foreshot at condensing temperatures from 59° to 100° C. and set aside. A 260 ml polymerization cut was collected in a calibrated dropping funnel at an average rate of 2.5 ml/minute.

About 130 ml of the MMA-$d_8$ was discharged from the funnel into a attached 500 ml argon-flushed glass mixing vessel; 1.28 ml of an solution of 1.28 ml of MMA-$d_8$, 1.28 ml of glycol dimercapto acetate (GDMA), and 0.080 g of 2,2'-azobis(isobutyronitrile) (Vazo® 64) was injected into the MMA-$d_8$ through a serum stopper and PTFE stopcock. Then the balance of 260 ml of MMA-$d_8$ was run into the mixing vessel and mixed with the other ingredients by a magnetically driven PTFE-coated impeller to produce a solution of 100 mol % MMA-$d_8$, 0.165 mol % (based on monomer) GDMA and 0.01 mol % (based on monomer) Vazo® 64.

The mixture was discharged by argon pressure through an 0.2 μm (micrometer) pore "Millipore" filter and FEP (copolymer of tetrafluoroethylene and hexafluoropropylene) tube into a rigorously cleaned chromium-plated stainless steel tube having an inside diameter of 28.7 mm (1.13 in) sealed at the bottom with a PTFE "O" ring gasketed stainless steel piston and at the top with a PTFE plug. After filling the tube, the PTFE plug was removed and immediately replaced with a PTFE gasketed piston. A few ml of the polymerization mixture were sampled from the mixing vessel after filing the polymerization tube.

Gas-liquid chromatography analysis of the retained sample indicated 99.87% (estimated from area under recorded curve) monomer purity, an nuclear magnetic resonance (NMR) analysis indicated that the proton content of the polymerization mixture was 534 μg/gm of mixture.

B. Purification of Glycol Dimercapto Acetate

A round-bottom flask was charged with 70 ml of glycol dimercapto acetate (Evans Chemetics, Inc., indicated to be 96.6% pure). Distillation was conducted with a Vigreau column. A 15 ml foreshot was collected at 0.27 to 0.26 mm Hg absolute at condensing temperatures of 80° to 104° C. and discarded. A 27 ml second cut was collected at 0.26 to 0.13 mm Hg absolute at condensing temperatures of 100° to 109° C. A 16 ml 3rd cut was collected at 0.3 to 0.37 mm Hg absolute pressure at condensing temperature of 110° to 117° C.

C. Polymerization

The chromium-plated tube was placed in a heat transfer jacket and the contents were pressurized to 24.3 kg/cm$^2$ (345 psig) by a pneumatic cylinder operating on the top piston. Silicone heat transfer fluid was pumped through the jacket according to the following schedule:

| Elapsed Time hr | Temperature °C. | Heating Rate °C./hr | Dilatometric Conversion % |
|---|---|---|---|
| 0–16 | 56 | — | 51.3 |
| 16–16.8 | 70 | — | 70.0 |
| 16.8–18.25 | 70–130 | 40 | — |
| 18.25–19.25 | 130 | — | — |
| 19.25–19.7 | 130–100 | −46 | — |
| 19.7–20.25 | 100 | — | 99.9 |

The finished polymer preform contained one large void near the middle and one at the top.

D. Extrusion

The extrusion equipment as described herein in reference to FIG. 2 was employed, with a spinning temperature of 214° C. and a line speed of 36.6 m/min (120 ft/min). The core of the optical fiber was made from the polymer rod fabricated in part C of this example, which was extruded by ram extrusion, with the ram advanced at constant rate and the temperature near the tip of the ram extruder at 245°–246° C. The cladding polymer, which was extruded with a conventional screw extruder, was a copolymer of 20% by weight of methyl methacrylate and 80% by weight of $$CF_3CF_2(CF_2CF_2)_pCH_2CH_2O-\overset{\overset{\displaystyle O}{\|}}{C}-\overset{\overset{\displaystyle CH_3}{|}}{C}=CH_2$$

(p is 1 to 8, with ca. 90% by weight being that where p is 2 and 3) having an inherent viscosity of 0.50 (measured on a 0.5% (wt./vol.) solution in 1,1,2,-trichloro-1,2,2,-trifluoroethane at 20° C.) and a melt index of 6 at 230° C. (measured by ASTM D-2116-66 with an orifice of 2.095 mm and a weight of 2160 gm). The screw extruder barrel temperature employed ranged from 229° C. near the hopper to 248° C. at the discharge end of the barrel.

Summary data are included in Table I.

TABLE I

| | |
|---|---|
| Polymer Properties | |
| Inherent Visc., dl/gm | 0.414 |
| Residual Monomer, % by wt. | 0.55 |
| Machine Draw Ratio | 5.50 |
| Fiber Properties | |
| Diameter, μm | 390 |
| Cladding thickness μm | 16 |

E. Attenuation

An attenuation spectrum was obtained from a 28.7 meter sample of the fiber utilizing a tungsten halogen source and a Bausch and Lomb High Intensity Monochromator with conditions shown below.

| Wavelength Range (nm) | Grating | Lines mm | Slit Width Entrance (mm) | Slit Width Exit (mm) | Cut Off Fiber |
|---|---|---|---|---|---|
| 400–800 | 33-86-76 | 1350 | 2 | 1 | None |
| 700–1100 | 33-86-77 | 675 | 2 | 1 | Corning 2-58 |

A Coherent Radiation Model 212 Power Meter was used to determine the optical power transmitted.

The spectrum indicated minimum attenuation as follows:

| Wavelength, nm | Attenuation, dB/km |
|---|---|
| 690 | 147 |
| 790 | 167 (grating - 76) |
| | 158 (grating - 77) |

EXAMPLE 2

Example 1 was substantially repeated with the following exceptions:

The crude MMA-$d_8$ was 207.2 gms of a third lot and 330.0 grams of a fourth lot. The monomer was purified by passing it through a fixed bed consisting of 15 cm of Woelm Basic Aluminum Oxide, Activity Grade 1, topped by 2 cm of 3A Molecular Sieves; 411.0 grams of MMA-$d_8$ was recovered for distillation and inhibited by DPPD. Fractionation was essentially as in Example 1, except about 73 g of foreshot was set aside. GLC analysis of the last drops of the polymerization mixture indicated 99.85% (area) monomer purity, NMR analysis indicated that the proton content of the polymerization mixture was 460 μg/gm of mixture.

Polymerization was substantially as in Example 1.

Final dilatometric conversion was 102.2%. The finished polymer preform contained only one void at the top. Extrusion was accomplished substantially as Example 1. Summary data are in Table II.

TABLE II

| | |
|---|---|
| Polymer Properties | |
| Inherent Viscosity, dl/gm | 0.410 |
| Residual Monomer, % by wt. | 0.52 |
| Machine Draw Ratio | 5.50 |
| Fiber Properties | |
| Diameter, μm | 390 |
| Cladding thickness, μm | 16 |
| Attenuation (as Example 1) | |
| Wavelength, nm | Attenuation, dB/km |
| 690 | 206 |
| 790 | 207 (grating - 76) |
| | 190 (grating - 77) |

EXAMPLE 3

The MMA-$d_8$ used in this example contained approximately equal fractional percentage amounts of methyl-$d_3$ acrylate and methyl-$d_3$ acrylate(2,2-$d_2$), $CD_2{=}CH\ COOCD_3$, as indicated by gas chromatography/mass spectrometry, and was obtained from thermal pyrolysis of a copolymer of 98.8 mol % MMA-$d_8$ and 1.2 mol % methyl-$d_3$ acrylate, the partially deuterated constituents arising from left or right-handed depolymerization of the comonomer units in the copolymer chain. The MMA-$d_8$ had originally been made by the method of Nagai described herein, except that a mixture of $CD_3OD$ and $CD_3OH$ was used in place of $CD_3OH$.

A. Purification of MMA-$d_8$

A 383 gm charge of methyl methacrylate-$d_8$ monomer was permitted to flow by gravity through a 40-mm diameter 11-cm deep bed of Woelm Basic Aluminum Oxide, Activity Grade 1, into a 500 ml round-bottom flask containing 0.5 g DPPD inhibitor and 39.6 g of monomer heel from a previous distillation. The monomer was distilled through a 13-mm diameter×40-cm high column packed with glass helices at a high reflux ratio. Fifty-one ml were collected as a foreshot at condensing temperatures up to 100° C. at atmospheric pressure and set aside. A 260-ml product fraction was collected in an argon filled dropping funnel at 1.5 ml/min at a condensing temperature of 100° C. at atmospheric pressure. The polymerization mixture was prepared substantially as in Example 1, except that 0.16 mol % GDMA was used, and similarly filtered into a polymerization tube. A few drops of the polymerization mixture were sampled from the mixing vessel after filling the polymerization tube; gas-liquid chromatography analysis indicated 99.88% (area) MMA-$d_8$ and 0.113% (area) of the indicated mixed isotopic forms of methyl acrylate.

B. Purification of Glycol Dimercapto Acetate

A 200-ml round-bottom flask was charged with 125 ml of glycol dimercapto acetate (Evans Chemetics, Inc., indicated to be 96.6% pure). Distillation was conducted with a 20-cm Vigreau column. An 18-ml forshot was collected at 0.20 to 0.15 mm Hg absolute at condensing temperatures of 60° to 109° C. and discarded. A 48-ml second cut was collected at 0.18 mm Hg absolute at condensing temperatures of 112°–113° C. A 10 ml third cut was collected at 0.5 mm Hg absolute pressure at condensing temperature of 124° C. Gas-liquid chromatography analysis indicated the second cut to be 99.4% pure and the third cut to be 99.2% pure.

C. Polymerization

The polymerization was conducted as in Example 1 with the following exceptions

| Elapsed Time hr. | Temperature °C. | Heating Rate °C./hr | Dilatometric Conversion % |
|---|---|---|---|
| 0–15.75 | 60 | nil | 99.2 |
| 15.75–16 | 60–130 | 280 | ca 99.2 |
| 16–17 | 130 | nil | |
| 17–17.5 | 130–100 | −60 | |
| 17.5–18 | 100 | nil | 102.1 |

At this time the pressure was released, and the system was allowed to cool to room temperature. The polymer rod was removed from the polymerization tube, small samples were taken for analysis, and the rod was placed within a clean extrusion cylinder.

D. Extrusion

Extrusion was accomplished substantially as in Example 1. Summary data are in Table III.

TABLE III

| | |
|---|---|
| Polymer Properties | |
| Inherent Visc., dl/g | 0.426 |
| Residual Monomer, % by wt. | 1.17 |
| Proton Content, μg/gm (NMR) | 239 |
| Machine draw ratio | 5.39 |
| Fiber Properties | |
| Diameter, μm | 394 ± 10 |
| Cladding thickness, μm | 16 |

E. Attenuation

An attenuation spectrum was obtained from a 22.1 meter sample of the fiber utilizing a Xenon arc lamp source and a Bausch & Lomb High Intensity Monochromator with conditions shown below.

| Wavelength Range (nm) | Grating | Lines/mm | Slit Width Entance (mm) | Slit Width Exit (mm) | Cut Off Filter |
|---|---|---|---|---|---|
| 400–800 | 33–86–02 | 1350 | 2 | 1 | None |
| 700–1100 | 33–86–03 | 675 | 2 | 1 | Corning 2-58 |

A Coherent Radiation Model 212 Power Meter was used to determine the optical power transmitted.

The spectrum indicates mimimum attenuation as follows:

| Wavelength, nm | Attenuation, dB/km |
|---|---|
| 690 | 223 |
| 790 | 229 (Grating - 02) |
| | 219 (Grating - 03) |

Comparative Examples A and B

A. Purification of Ethyl Acrylate

Four hundred ml of ethyl acrylate (Rohm & Haas) was dripped through a 38-mm diameter×10 cm deep bed of Woelm Basic Aluminum Oxide (Activity Grade 1, Woelm Pharma GmbH & Company) into a 500-ml round-bottom flask containing about 0.5 gm N,N'-diphenyl-para-phenylene diamine (DPPD) as polymerization inhibitor. The flask was fitted with a 15-mm diameter×45-cm glass-helix packed column and a still head. Distillation was conducted at atmospheric pressure. Approximately 115 ml foreshot collected at boiler temperatures up to 101° C. was discarded; 200 ml of polymerization grade comonomer was collected at boiler temperatures between 100.5° to 101.5° C. Analysis by gas-liquid chromatography indicated purity exceeding 99%.

B. Purification of Methyl Methacrylate

A 1650-ml charge of methyl methacrylate (Du Pont Type H112) was dripped through a 90-mm diameter×8-cm deep bed of Woelm Basic Aluminum Oxide, Activity Grade 1, into a 2-1 round-bottom flask containing 0.5 g DPPD inhibitor. The monomer was distilled through a 25-mm diameter×56-cm high column packed with glass helices at a high reflux ratio. Four hundred ml were collected as a foreshot at condensing temperatures up to 101° C. at atmospheric pressure and discarded; the still was cooled and blanketed with filtered argon. The next day an additonal 100 ml foreshot was collected and discarded, and a 520 ml product cut was collected in an argon filled dropping funnel at 1.93 ml/min, condensing temperature of 101° C. at atmospheric pressure.

About 260 ml of the MMA was discharged from the funnel into an attached 2-1 argon flushed glass mixing vessel; 2.64 ml of a solution of 2.64 ml of ethyl acrylate, 2.64 ml of glycol dimercapto acetate (second cut, Example 1, Part B), and 0.1600 g of Vazo® 64 was injected into the MMA through a serum stopper and PTFE stopcock. Then the remainder of 520 ml of MMA was run into the mixing vessel and mixed with the other ingredients by a magnetically driven PTFE coated impeller to produce a solution 99.75 mol % MMA, 0.25 mol % EA, 0.17 mol % (based on monomer) GDMA and 0.01 mol % (based on monomer) Vazo® 64.

Half of the mixture was filtered into a first chromium plated stainless steel tube as in Example 1. The second half of the monomer mixture was similarly discharged into a second tube. The second tube was placed in a freezer at −20° C.

C. Polymerization

Polymerization was substantially as Example 1 with the following exceptions.

| Elapsed Time hr. | Temperature °C. | Heating Rate °C./hr | Dilatometric Conversion % |
|---|---|---|---|
| 0–16 | 60 | nil | 54.1 |
| 16–16.9 | 70 | nil | 70 |
| 16.9–18.4 | 70–130 | 40° C./hr | — |
| 18.4–19.4 | 130 | nil | — |
| 19.4–20 | 130–100 | ca −60 | — |
| 20–20.4 | 100 | — | 99.7 |

The pressure was then relieved and the recirculating oil allowed to cool.

The polymer rod was removed from the polymerization tube, small samples were taken for analysis, and the rod was placed in a polyethylene bag without handling and overwrapped with aluminum foil.

The contents of the second tube were polymerized in substantially the same manner.

D. Extrusion

Extrusion of both preforms was accomplished substantially as Example 1.

E. Attentuation

Utilizing the equipment cited in Example 3, grating 33-86-02, the monochromator was tuned to the wavelength of maximum transmission in the vicinity of 650 nm, using a sample ca. 20 meters long. It has been established that the wavelength so defined is the wavelength of minimum attentuation for protonated poly-MMA core fibers. The attenuation at that wavelength was determined. The results are summarized in Table IV.

TABLE IV

Data for Comparative Examples A, B

| Core Polymer | Ex. A | Ex. B |
|---|---|---|
| Properties | | |
| Inherent Visc., dl/gm | | |
| Residual Monomer, wt % | 1.01-1.03 | 0.89 |
| Fiber | | |
| Spinning Temp., °C. | 215 | 215 |
| Line Speed, ft/min. | 120 | 120 |
| Cladding Thickness, μm | 16 | 16 |
| Properties | | |
| Diameter, μm | 390 ± 20 | 396 ± 18.8 |
| Wavelength for Max. Transmission, nm | 650 | 651 |
| Attenuation at λmax, dB/km | 260 | 305 |

Example 4 and Comparative Example C

Methyl methacrylate-$d_8$ used in this example was synthesized by the method of Nagai except that DCN was used in place of HCN.

Optical fibers were prepared from MMA-$d_8$ (Ex. 4) and from MMA (Example C) as follows.

Rods of core polymer were first prepared. For Ex. 4, a mixture of 21.69 g (99 mol %) of purified MMA-$d_8$, 0.25 mol (1 mol %) ethyl acrylate, 0.095 ml (0.2 mol %, based on monomer) of lauryl mercaptan, and 0.0015 g (0.0045 mol %, based on monomer) of Vazo® 64 was prepared in an Erlenmeyer flask, and it was deoxygenated by swirling and bubbling nitrogen through it. The mixture was drawn into a syringe and filtered through a pack of four fluorocarbon "Millipore" filters (pore sizes 5, 0.2, 0.2, 5 μm) into a 9-mm outside diameter rigorously cleaned glass tube. For Example C, a mixture of 20.0 g (99 mol %) of MMA (Du Pont type H112, distilled), 0.25 ml (1 mol %) ethyl acrylate, 0.095 ml (0.2 mol %), based on monomer) of lauryl mercaptan, and 0.0015 g (0.0045 mol %, based on monomer) Vazo® 64 was prepared, and a like glass tube similarly filled. The mixtures were polymerized by subjecting them at atmospheric pressure to the following heating schedule:

| elapsed time, hrs. | temp., °C. |
|---|---|
| 0-16.5 | 70 |
| 17-20.3 | 90 |
| 20.6-24 | 100 |
| 24-24.5 | 110 |
| 24.5-24.8 | 112 |

The tubes were then slowly cooled. The glass tubes were broken away from the polymer rods. The inherent viscosity (0.2 g of polymer in 100 ml of solution in chloroform at 25° C.) of the Example 4 polymer was 0.4995 dl/g and that of Control C polymer was 0.452 dl/g. Both rods contained some voids.

Each core rod was then placed within a clean glass tube of 11-mm outside diameter × 1-mm wall, and centered and held in the center of the tube with coiled 20-gauge copper wire. The annular space was filled in each case with a solution prepared as follows. In 2.5 g (10 wt. %) of MMA was dissolved 0.0085 ml (0.029 wt. % based on monomer) of lauryl mercaptan and 0.0375 (0.15 wt. %, based on monomer) of Vazo® 64, and to this was added 22.5 g. (90 wt. %) of the fluorinated comonomer described in Example 1, Part D, and the mixture was deoxygenated by bubbling nitrogen through it. The mixture was filtered into the annular spaces mentioned above. The core polymer rods tended to float up, and were held in place with stainless steel wire. The monomer mixture in the indicated annular spaces was polymerized at atmospheric pressure by heating at 50° C. for 5 hrs and then at 90° C. for about 19 hrs. This polymer layer, to become the cladding of the optical fiber, also contained some voids. Again the glass tube was removed by breaking it away. Each composite polymer rod was then cut into lengths of 5 to 7.5 cm (2 to 3 in).

Optical fibers were spun from the composite rods by extruding them in an Instron capillary rheometer having a bore diameter of 9.5 mm (0.375 in ) with a die having a diameter of 9.5 mm (0.375 in) and a 60° taper to an 1.0 mm (0.040 in) orifice. A length (5 to 7.5 cm) of a composite rod was placed in the heated cylinder of the rheometer, and the heat-softened composite rod was extruded through the die fitted to the bottom of the rheometer cylinder by advancing the rheometer piston at a constant rate. The extrusion temperature was 205°-210° C. The cross-head rate of the Instron machine was 5.1 mm/min (0.2 in/min). Pressures were 7.7 kg/cm$^2$ (109 psig) for Example 4 and 7 kg/cm$^2$ (100 psig) for Control C. The composite extrudate was drawn away at constant speed, cooled, and the resulting step-index optical fiber was wound up at 5.7 m/min (18.7 ft/min) at constant, low tension on 5-cm (2-in) diameter fiber cores; a transversing wind-up was used, so successive layers of fiber were laid on previous layers with crossovers.

Attenuation of transmitted light was measured as described by E. A. J. Marcatili, "Factors Affecting Practical Attentuation and Dispersion Measurements," Optical Fiber Transmission II, Technical Digest, Optical Society of America, 1977, paper TuE1. For the measurements reported herein, the light source was a tungsten-halogen (incandescent) projector lamp powered by a DC voltage and current stabilized supply, and the wavelengths used were selected with interference filters having peak wavelengths shown in Table IV, band widths of 10 nm, 50% minimum transmission and average transmission of the side bands of $10^{-4}$, specifically, Ealing-IRI interference filters. The input end of the fiber was placed at the circle of least confusion of the source. Numerous experiments indicated that the $\log_{10}$ power was linear with length, and therefore that for practical purposes transmission was at a steady state. Summary data are given in Table V.

TABLE V

| Fiber Properties | Ex. 4 | Example C |
|---|---|---|
| Diameter, μm | 264 ± 13 | 267 ± 13 |
| Cladding thickness, μm | 50 | 100 |
| Attenuation, dB/km | | |

TABLE V-continued

| Fiber Properties | Ex. 4 | Example C |
|---|---|---|
| Wavelength, nm* (nominal) | | |
| 546.1 | 1590 | 2040 |
| 632.8 | 1170 | 1632 |
| 656.3 | 1100 | 1320 |
| 670.8 | 1060 | 1360 |
| 694.3 | 1020 | 1400 |
| 767.0 | 1150 | 1800 |
| 794.7 | 940 | 2240 |
| 852.1 | 1300 | 3230 |
| 900.0 | 1380 | 7510 |

*Interference filters

Example 5 and Comparative Example D

Example 4 was repeated using additional core polymer rods as prepared for Ex. 4 and Comparative Example C, but with the following exceptions.

The cladding polymer prepared in the annular spaces was polymerized from a mixture of 15 g (15 wt %) MMA, 0.059 ml (0.05 wt %, based on monomer) lauryl mercaptan, 0.2 g (0.2 wt %, based on monomer) Vazo® 64, and 85 g (85 wt %) of the fluorinated comonomer of Ex. 1, Part D. The cladding polymer was polymerized in the annular spaces by heating at 50° C. for 16 hrs. The inherent viscosity of the cladding polymer was 0.403 dl/g (measured on a solution of 0.5 g polymer in 100 ml of solution in 1,1,2-trifluoro-1,2,2-trichloroethane at 25° C.)

The extrusion die used in the rheometer when spinning the optical fiber had a diameter of 9.5 mm (0.375 in) and a 41.2° taper to an 0.9 mm (0.036 in) diameter by 1.27±0.13 mm (0.050±0.005 in) long ballized orifice. The extrusion temperature was 210° C., with pressures of 7-8.3 kg/cm$^2$ (100-118 psig) for Example 5 and 6.4-7.7 kg/cm$^2$ (91-109 psig) for Example D. The fiber was wound at constant speed of 6 m/min (20 ft/min) onto a drum having a 1-meter circumference, a traversing wind-up was used, and fiber crossovers were avoided. Summary data are given in Table VI.

TABLE VI

| Fiber properties | Ex. 5 | Example D |
|---|---|---|
| Attenuation, dB/km Wavelength, 632.8 nm He—Ne laser) | 992 | 1205 |
| Wavelength, nm* | | |
| 546.1 | 1863 | |
| 656.3 | 765 | |
| 670.8 | 669 | |
| 694.3 | 611 | |
| 767.0 | 578 | |
| 794.7 | 557 | |
| 852.1 | 627 | |
| 900.0 | 934 | |

*Interference filters

We claim:

1. An optical fiber comprising a core and cladding which consist essentially of organic high polymers, said core being a [deuterated acrylate] polymer *selected from the group consisting of a deuterated methacrylate homopolymer, a deuterated methacrylate copolymer and a deuterated methacrylate/acrylate copolymer* and containing less than 20 mg of hydrogen per gram of polymer as measured by nuclear magnetic resonance of 60 MHz.

2. The optical fiber of claim 1 wherein said core is a polymer comprising at least 60 mol % deuterated methyl methacrylate units.

3. The optical fiber of claim 1 wherein said core contains less than 10 mg of hydrogen per gram of polymer as measured by nuclear magnetic resonance at 60 MHz.

4. The optical fiber of claim 3 wherein said core is a polymer comprising at least 90 mol % deuterated methyl methacrylate units.

5. The optical fiber of claim 1 wherein said core contains less than 1 mg of hydrogen per gram of polymer as measured by nuclear magnetic resonance at 60 MHz.

6. The optical fiber of claim 5 wherein said core is a polymer which comprises at least 95 mol % deuterated methyl methacrylate units.

7. The optical fiber of claim 5 wherein said core is a polymer which consists essentially of perdeuterated methyl methacrylate units.

8. The optical fiber of claim 1 wherein said cladding is a copolymer of $$X(CF_2)_n(CH_2)_mOC(=O)-C(Y)=CH_2,$$

wherein X is F, H or Cl; Y is $CH_3$ or H; m is an integer from 1 to 6; and n is an integer from 2 to 10, with at least one of the methyl or ethyl esters of acrylic or methacrylic acids.

9. The optical fiber of claim 1 wherein said cladding is a copolymer of methyl methacrylate and $$CF_3CF_2(CF_2CF_2)_pCH_2CH_2O-C(=O)-C(CH_3)=CH_2$$

where p takes the values of integers from 1 to 8 with a major proportion being that where p is 2 and 3.

10. The optical fiber of claim 8 wherein said core contains less than 10 mg of hydrogen per gram of polymer as measured by nuclear magnetic resonance at 60 MHz.

11. The optical fiber of claim 8 wherein said core is a polymer which comprises at least 95 mol % perdeuterated methyl methacrylate units.

12. The optical fiber of claim 9 wherein said core contains less than 1 mg of hydrogen per gram of polymer as measured by nuclear magnetic resonance at 60 MHz.

13. The optical fiber of claim 9 wherein said core is a polymer which consists essentially of perdeuterated methyl methacrylate units.

* * * * *